United States Patent
Howard

(10) Patent No.: US 8,565,228 B1
(45) Date of Patent: Oct. 22, 2013

(54) SYSTEMS AND METHODS FOR SELECTING AND RANKING VIDEO STREAMS

(75) Inventor: Michael L. Howard, Renton, WA (US)

(73) Assignee: Control4 Corporation, Salt Lake City, UT (US)

( * ) Notice: Subject to any disclaimer, the term of this patent is extended or adjusted under 35 U.S.C. 154(b) by 549 days.

(21) Appl. No.: 11/692,830

(22) Filed: Mar. 28, 2007

(51) Int. Cl.
*H04L 12/28* (2006.01)

(52) U.S. Cl.
USPC .......................................................... 370/389

(58) Field of Classification Search
USPC ......... 370/217, 236, 231, 219, 232, 230, 228, 370/229
See application file for complete search history.

(56) References Cited

U.S. PATENT DOCUMENTS

| 7,272,657 | B2 * | 9/2007 | Allen et al. .................... 709/231 |
| 7,702,014 | B1 * | 4/2010 | Kellock et al. ........... 375/240.08 |
| 2001/0004739 | A1 * | 6/2001 | Sekiguchi et al. ............ 707/100 |
| 2003/0023742 | A1 | 1/2003 | Allen et al. |
| 2003/0038838 | A1 * | 2/2003 | Pollitt ........................... 345/741 |
| 2007/0180106 | A1 * | 8/2007 | Pirzada et al. ................ 709/224 |
| 2008/0127272 | A1 * | 5/2008 | Cragun et al. .................. 725/46 |
| 2008/0258633 | A1 * | 10/2008 | Voysey ......................... 315/159 |

* cited by examiner

*Primary Examiner* — Dang Ton
*Assistant Examiner* — Nourali Mansoury
(74) *Attorney, Agent, or Firm* — Austin Rapp & Hardman

(57) ABSTRACT

Systems and methods for selecting and/or ranking video streams to be transmitted to a client node are described. A first set of video streams is received at a receiving node. A set of display criteria is also received at the receiving node. One or more of the video streams from the first set of video streams is selected and/or ranked to form a second set of video streams. The second set of video streams is transmitted to a client node. The second set of video streams may then be displayed at the client node.

30 Claims, 8 Drawing Sheets

SYSTEMS AND METHODS FOR SELECTING AND RANKING VIDEO STREAMS

TECHNICAL FIELD

The present invention relates generally to computers and computer-related technology. More specifically, the present invention relates to systems and methods for selecting and ranking video streams.

BACKGROUND

The price of electronic devices has continued to decrease dramatically. In addition, the types of consumer electronic components that can be purchased have continued to increase. For example, DVD players, large screen TVs, multi-carousel CD and DVD players, MP3 players, video game consoles, and similar consumer electronic items have become more widely available while continuing to drop in price.

The decreasing prices and increasing types of consumer electronic components have resulted in today's homes and businesses being filled with modern conveniences. Yet, as these conveniences grow in number and sophistication, they also become more difficult to manage and control. Typical homes and businesses include a number of televisions, computer monitors and/or screens of some kind for viewing various kinds of visual items.

Like other types of electronic devices, video cameras, including web cams and surveillance cameras, have continued to decrease in price. As a result, video cameras are more widely used than ever before. Many homes and businesses now include a number of video cameras to monitor activity. These video cameras can monitor a wide range of activity that previously could not be reviewed and analyzed.

Unfortunately, the information produced by the video cameras can be so voluminous that it is difficult to sort through and identify that which is meaningful. In many cases, it would be impossible, or virtually impossible, to review all of the video generated by these systems. Consider, for example, a home with six video cameras running 24 hours a day. Each day over 144 hours of video are generated. Even if this video is reviewed at four times its normal speed, it would require 36 hours to review all the video. It would require a team of four people working nine hours a day to review the video produced by this simple system.

Accordingly, a system and method for identifying meaningful aspects of generated video streams is desirable.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
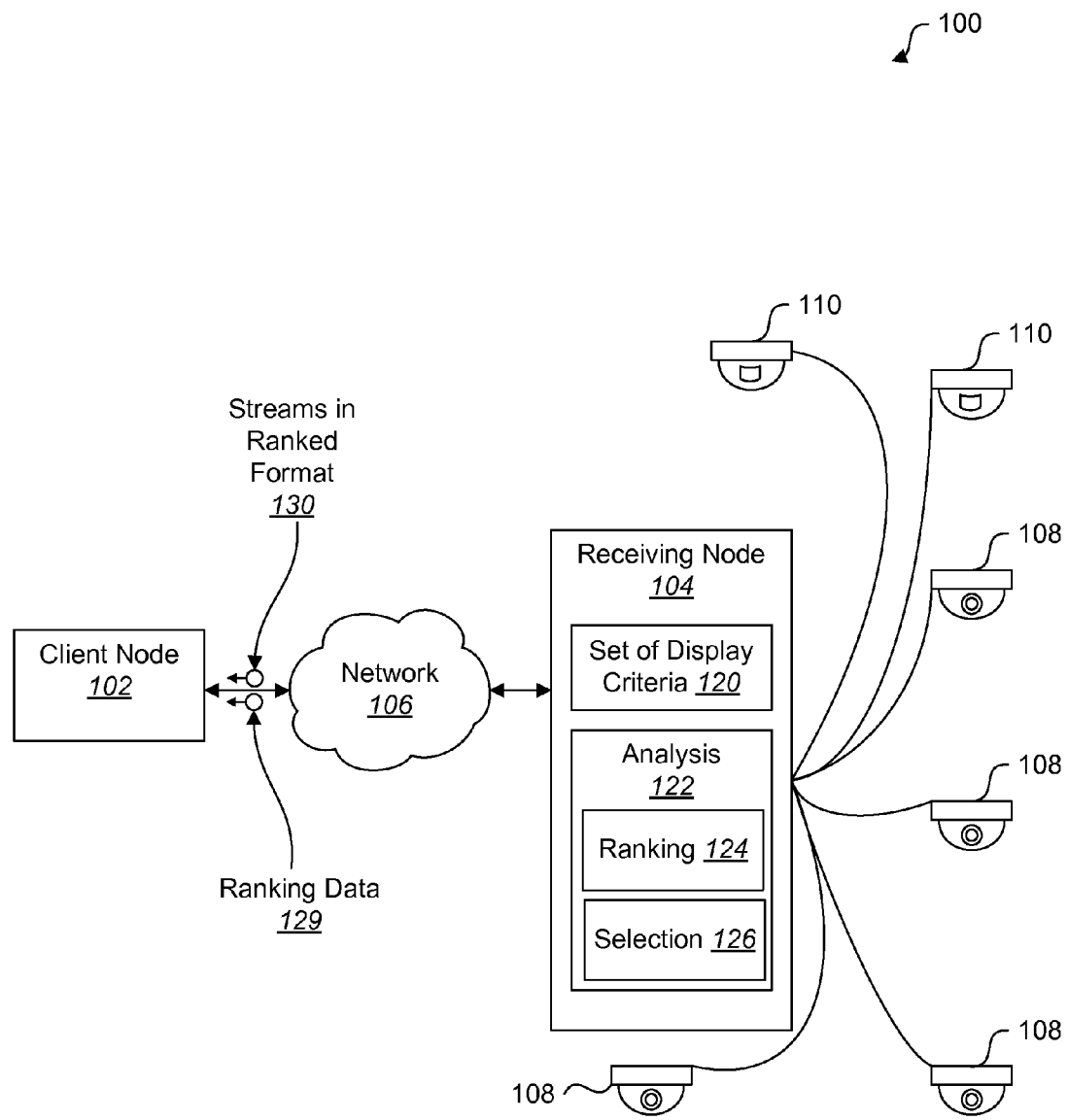
FIG. 1 is a block diagram illustrating one embodiment of a system for selecting and ranking video streams.

Embodiments disclosed herein relate to systems and methods for selecting video streams to be transmitted to a client node. In an exemplary method, a first set of video streams are received at a receiving node. A set of display criteria are also received at the receiving node. At least one of the video streams is selected based on the set of display criteria to form a second set of video streams. The second set of video streams is transmitted via a network to a client node in accordance with the set of display criteria.

One or more of the video streams from the second set of video streams may be displayed at a client node. Also, in one embodiment, one or more of the video streams from the second set of video streams may override the currently displayed stream on the client node.

The second set of video streams may be ranked based on the set of display criteria. The ranking data may be transmitted to the client node. Also, the second set of video streams may be transmitted to the client node in a ranked format. The second set of video streams may comprise less than all video streams in the first set of video streams.

Control system data may also be received at the receiving node. The set of display criteria may utilize control system data. Control system data is data relating to the control of features or components of an environment or structure, such as data related to the control of heating or lighting systems. One example of control system data is data that indicates whether a light switch within a control site is on or off.

In another embodiment, a method for selecting video streams based on video stream values is disclosed. A set of video stream values are received at a receiving node. Each video stream value indicates at least one characteristic of a corresponding video stream. A set of display criteria is received at the receiving node. It is then determined whether any video streams satisfy the set of display criteria based on an analysis of the set of video stream values. If any video stream satisfies the set of display criteria, a set of video streams that satisfy the set of display criteria is identified.

A notification message may be sent if the analysis of the set of video stream values indicates that no video streams satisfy the set of display criteria. Also, a transmission message may be sent requesting transmission of one of the video streams in the set of selected video streams. A request message may further be sent to determine whether a user wants to view at least one of the video streams from the set of selected video streams. Instructions may be received at the receiving node to transmit or stop transmitting video streams.

A video stream value may comprise, in one embodiment, a set of values corresponding to different characteristics of a single video stream. A video stream value could also comprise, for example, a numeric value. One of the set of video stream values could also comprise a segment of a video stream. A set of analysis criteria at a node that is remote to the receiving node may be used to generate a video stream value.

Systems that perform the foregoing methods are also disclosed. In addition, computer readable media may be utilized to perform the methods disclosed herein.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment," and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 is a block diagram illustrating one embodiment of a system 100 for selecting and ranking video streams. The system includes a client node 102 in communication with a receiving node 104 via a network 106. The receiving node 104 is in electronic communication with a number of video cameras 108 and image sensors 110. The video cameras 108 may be in direct electronic communication with the receiving node 104, as illustrated in FIG. 1. Alternatively, the video cameras 108 may be in indirect electronic communication with the receiving node 104, such as through the network 106.

The client node 102 may be embodied in a number of different ways and may be, for example, a digital video recorder (DVR). In such an embodiment, the selected and ranked video streams may be viewed at the user's convenience. Alternatively, the client node 102 could be, for example, a television set, desktop computer, laptop computer, personal data assistant (PDA), cellular telephone, other types of embedded devices, or any other electronic device capable of displaying video or images.

In one embodiment, the client node 102 could involve a number of different devices. For example, if a site includes many different video monitors, the client node 102 could be all of the video monitors that are currently turned on, or only certain video monitors that are turned on, such as video monitors situated in the kitchen of a home. In one embodiment, the client node 102 does not have the capability to display video, but comprises a storage or routing point that can be accessed from one or more other client nodes 102 for viewing.

The network 106 may be embodied in a number of different ways. The network 106 may be a wired or wireless network or may include elements of both. The network 106 could include local area networks (LANs), storage area networks (SANs), metropolitan area networks (MANs), wide area networks (WANs), and combinations thereof (e.g., the Internet) with no requirement that the client node 102 and the receiving node 104 reside at the same physical location, the same network segment, or even in the same network. A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, infrared (IR) connection, 802.11g wireless standard, 802.15.4 wireless (ZigBee) standard, and so forth, including combinations thereof. Of course, some embodiments may also be practiced with conventional point-to-point connections, such as enterprise systems connection (ESCON), small computer system interface (SCSI), fibre stream, universal serial bus (USB) connections, etc., that may not typically be viewed as a "network."

The receiving node 104 is an electronic device coupled to the network 106. The receiving node 104 receives and processes the video stream(s) and retransmits the video stream(s) to the client node 102 in accordance with the set of display criteria 120.

The receiving node 104 may be, for example, a computer with software designed to perform the functions explained herein. Alternatively, the receiving node 104 may be an embedded device having a combination of software and/or embedded commands for performing these operations. Of course, many different types of computing devices may serve as a receiving node 104.

As explained above, the receiving node 104 is in electronic communication with one or more video cameras 108 and optionally in communication with one or more image sensors 110. The receiving node 104 may be in communication with the video cameras 108 or image sensors 110 via the network 106 or any other type of electronic communication channel.

The video cameras 108 generate video and/or still shots and/or audio pertaining to the scenes at which each camera is pointed. The video cameras 108 may generate periodic still shots, in one embodiment, and/or may transmit a sufficient number of frames to constitute the transmission of "video." Thus, the term "video" or "video stream(s)," as used herein, may include traditional motion video, still shots, and/or accompanying audio transmitted or stored in any format and is not limited to video sent in a "streaming" format. The video cameras 108 may be embodied in a number of different ways and may include, by way of example only, Web cams or proprietary security cameras. A video camera 108 may also include an infrared camera for detection of the temperature of objects within a monitored scene.

The video streams may also include programming generated by a broadcast company, such as ESPN, or may include video surveillance streams generated by Web cams, security cameras, or other video capture devices.

The system 100 may optionally include image sensors 110. The image sensors 110 may include CCD or CMOS image sensors, for example, or any other device that is able to generate a multi-pixel representation of the electromagnetic spectrum. The image sensors 110 may be embodied in various ways and may be integrated with video cameras 108 and other devices, such as a motion activated light, or may be physically separate devices. An image sensor 110 could also include, by way of example only, a motion sensor.

The receiving node 104 includes a set of display criteria 120 and an analysis component 122. The analysis component 122 may include a ranking component 124 and a selection component 126.

The set of display criteria 120 comprises one or more rules governing which video streams are transmitted to the client node 102. The set of display criteria 120 may also control when the video streams are transmitted to the client node 102 and the ranking of the transmitted video streams. The set of display criteria 120 could be related to, for example, the frequency or timing of motion within a particular video stream, or audio levels within the incoming video streams (if audio is present). Furthermore, facial or object identification may also be utilized as part of the set of display criteria 120 for selecting and ranking video streams.

A set of display criteria 120 could include inactivity or a lack of motion for a set period of time. This set of display criteria 120 could be used, for example, to indicate that a child has fallen asleep and that the parent may enter the room to turn off the lights.

Positioning of objects, animals, and people could also be detected within a video stream using facial or object recognition, or simply by focusing on activity within a particular area of a video stream. For example, a high level of activity near the lower portion of the back door could indicate that a user's dog would like to reenter the house. A change of position of a person sleeping could be utilized to determine whether an elderly person in bed needs assistance getting out of bed.

Further, the set of display criteria 120 could be related to incoming data outside the scope of the video streams. This type of data could include, for example, data from image sensors 110.

As the names of these components suggest, the selection component 126 selects which video streams will be forwarded to the client node 102 and the ranking component 124 ranks the video streams. Not every embodiment of the analysis component 122 requires both a ranking component 124 and a selection component 126. For example, in one embodiment, only a selection component 126 is included. In that case, the order in which video streams are transmitted to the client node 102 does not have any significance or reflect a priority.

Alternatively, an analysis component 122 may include only a ranking component 124. For example, the set of display criteria 120 may include ranking based on motion levels within each of the video streams. In other words, the stream with the highest or lowest level of activity receives the first priority. In that case, all of the received video streams are transmitted to the client node 102 and those with the highest-ranking are highlighted or otherwise emphasized.

Alternatively, the ranking and selection components 124, 126 may be highly interactive and dependent upon each other. For example, in one embodiment, video streams selected by the selection component 126 are ranked by the ranking component 124. In an alternative embodiment, only video streams that receive a specific type of ranking (e.g., the highest five ranked video streams based on the set of display criteria) are selected for transmission to the client node 102.

For video streams that have been ranked, the ranking may be displayed in a number of different ways. For example, the video streams may be transmitted in sequence or in a serial manner with the highest ranked video stream being transmitted first. Alternatively, the video streams may be transmitted in a parallel or multiplexed format such that all of the selected video streams may be simultaneously displayed on the client node 102.

The video streams, in one implementation, may be simply displayed as separate channels on the client node 102. A user of the client node 102 can cycle through the video streams simply by changing the channel on the client node 102. The order of the streams/channels, in one implementation, may be varied in accordance with the assigned rank. Streams with the highest rank could be displayed at a highest or lowest channel number, beginning at a specific channel number, or within a set or block of channels reserved for the ranked or selected streams.

The selected video streams may be transmitted in a number of different ways to the client node 102. For example, the selected video streams may be transmitted in a format that requires significant processing by the client node 102 in order to be displayed, such as MPEG-2 or MPEG-4 formats. Alternatively, the selected video streams may be transmitted in a format that requires very little processing by the client node 102, such as the S-video format.

In one embodiment, the client node 102 receives the selected video streams and ranking data 129. The client node 102 engages in significant processing and controls how the ranked video streams are displayed on the client node 102. In an alternative embodiment, formatting of the streams in a ranked format 130 is controlled by the receiving node 104.

In one embodiment, the analysis component 122 could interrupt specific programming, if appropriate. For example, if a video camera 108 is monitoring an infant's crib, the analysis component 122, in accordance with the set of display criteria 120, could interrupt and override programming that the user is viewing on the client node 102. For example, the receiving node 104 could transmit a video feed of the crib to the client node 102 when there is a significant change in activity or noise level detected (e.g., indicating that the child is awake and crying), overriding the currently displayed programming. "Overriding" may also include displaying a new video stream with the currently displayed video stream. In one embodiment, for example, the video feed of the crib could be displayed in a picture-in-picture mode or concurrently with other programming that was previously being displayed on the client node 102, such as showing the current programming and the video feed of the crib in a side-by-side configuration or in a configuration with one or more other video streams. The video streams may be displayed in a matrix if the set of display criteria 120 so specifies. In one embodiment, only the audio is overridden such that crying from the crib can be heard while the picture of the currently displayed programming remains visible.

The set of display criteria 120 could include overriding currently displayed video streams based on a number of considerations. For example, significant activity in the backyard of a home, near the front door of a home, or in the parking lot of a business after midnight could override current programming and display a video stream of the area of concern. However, in this example, significant activity in the parking lot of a business during the day would not override current programming. In an embodiment where an infrared camera is utilized, the set of display criteria 120 could override programming to display a video stream of the user's backyard when heat is detected in this area when, for example, the neighbor's dog or cat is present.

The disclosed systems and methods significantly conserve network resources. In some embodiments, rather than transferring all incoming video streams to the client node 102, only the selected video streams are transferred. Thus, the network bandwidth is conserved and may be utilized for other applications or for the transmission of video streams to other client nodes 102 within the network 106. Furthermore, excluding video streams or ranking video streams can be extremely beneficial to users. The user's attention is immediately drawn to the emphasized or selected video streams without sorting through a number of likely insignificant streams.

The set of display criteria 120 could also be adapted to control how limited network bandwidth is utilized. For example, if M nodes 102 request N videos streams, and there is only N-1 or less bandwidth in the network 106, the set of display criteria 120 could control which video streams are transmitted and, in one embodiment, transmit the video streams that meet the requests of the maximum number of client nodes 102. In one configuration, this may be achieved by cycling through all or some of the video streams, but altering the order and length of time the video streams are displayed.

The disclosed systems and methods may be embodied in various ways beyond those illustrated in FIG. 1. For example, there could be a number of receiving nodes 104 within a system 100. In such an embodiment, each video camera 108 could have an assigned receiving node 104. The set of display criteria 120 could be distributed among the various receiving nodes 104 or could be centralized for processing at one or more specific receiving nodes 104. Furthermore, the disclosed systems could be utilized in connection only with home-based systems, business-based systems, or could be used with any type of system 100.

Also, other types of sensors and transmitters may be used within the scope of the disclosed systems and methods. By way of example only, radiofrequency identification (RFID) or similar technology may be utilized to identify when people (or a specific person) are located in a room or area. This could be achieved by placing RFID sensors at doorways or other appropriate locations and sensing when an RFID transmitter passes by the location. The transmitters could be carried by a person as bracelets or credit-card style devices in a person's wallet.

Utilizing this type of tracking system, high priority video streams may be routed to the video monitor closest to a particular individual based on the set of display criteria 120. In this way, a set of display criteria 120 could be tailored to individual needs and wants with priorities between the individuals when multiple individuals are situated within the same room or area. A similar function could also be performed by tracking down where a person is logged on at a computer and routing the video to the appropriate computer, whether logged on at a wired or wireless network.

Figure 2:
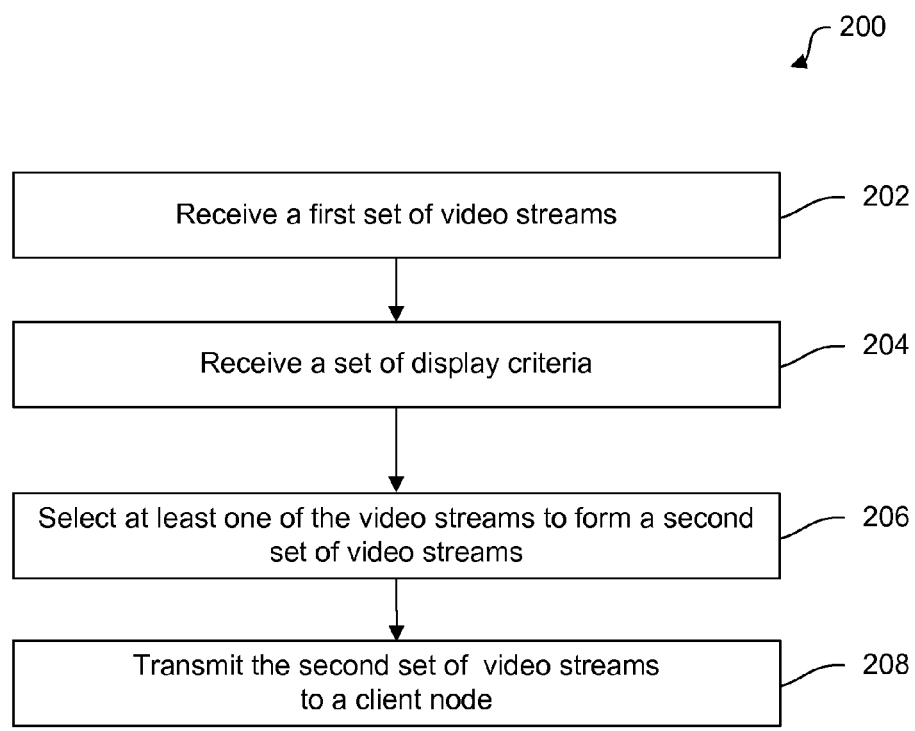
FIG. 2 is a flow diagram illustrating one embodiment of a method for selecting video streams.

FIG. 2 is a flow diagram 200 illustrating one method of selecting and ranking video streams. A first set of video streams are received 202 at a receiving node 104. The first set of video streams may comprise, for example, broadcast content or video from surveillance or local video cameras. The first set of video streams may comprise a single or multiple video streams.

The receiving node 104 also receives 204 a set of display criteria 120. As indicated above, the set of display criteria 120 specifies one or more criteria that the analysis component 122 uses to determine which video streams are selected and transmitted to a client node 102.

At least one of the video streams is then selected 206 using a set of display criteria 120 to form a second set of video streams. The selecting processes may be performed by an analysis component 122 (FIG. 1). As explained above, the selecting and ranking steps may be intertwined or may be completely independent.

The second set of video streams are then transmitted 208 to a client node 102 via the network 106 for display in accordance with the set of display criteria 120. The second set of video streams could be transmitted 208 to the client node 102 in a number of different ways. For example, the second set of video streams could be transmitted 208 in separate channels to the client node 102. Alternatively, the second set of video streams could be transmitted 208 as a single channel displaying all or multiple selected video streams as a single screen/channel. The second set of video streams may comprise all, or less than all, of the video streams in the first set of video streams.

The set of display criteria 120 may control when and the conditions upon which the second set of video streams are transmitted 208 to the client node 102. As explained above, one or more of the video streams from the second set of video streams may override a video stream currently displayed on the client node 102 as dictated by the set of display criteria 120.

The disclosed methods 200 may be embodied in various ways beyond those illustrated in FIG. 2. For example, the receiving node 104 and client node 102 could be an integrated device, obviating the need for transmission of the second set of video streams over the network 106.

Figure 3:
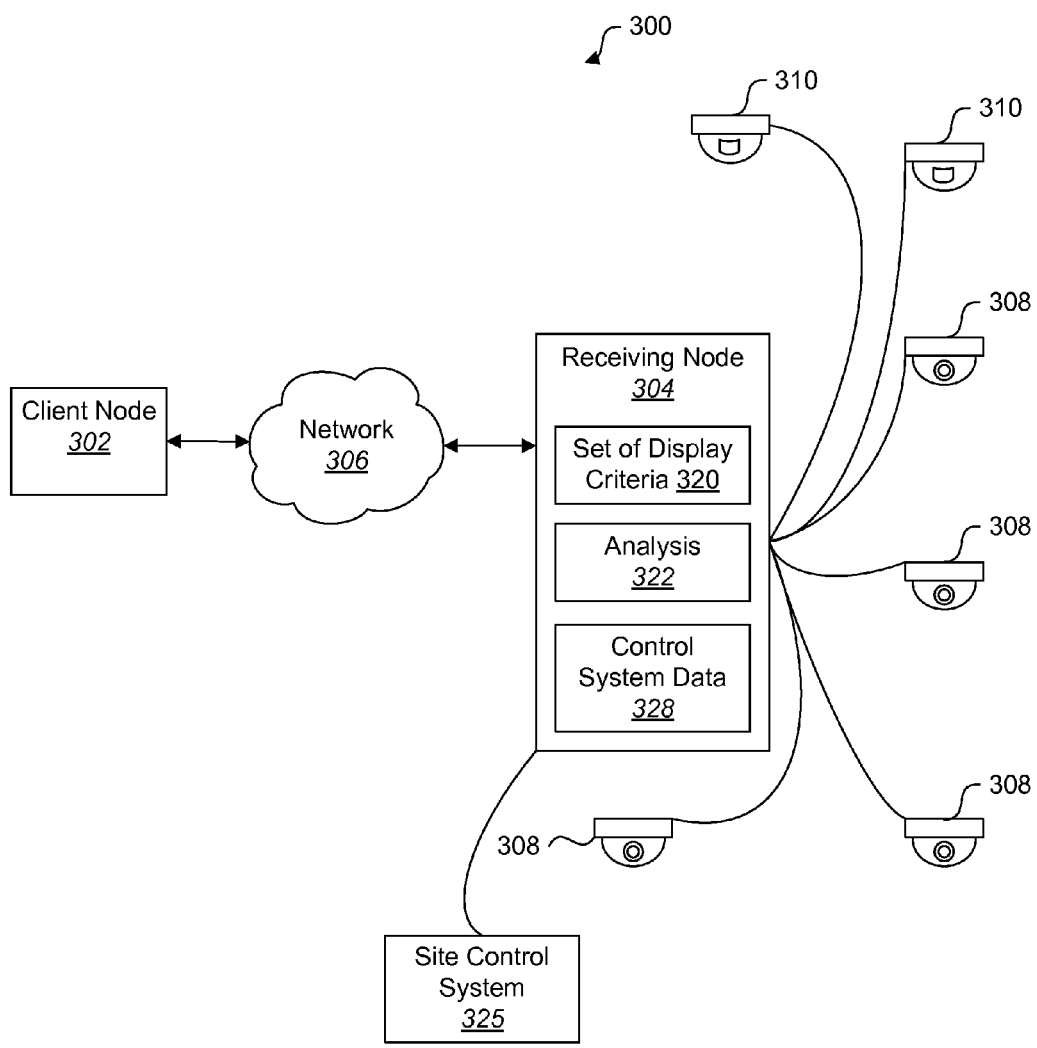
FIG. 3 is a block diagram illustrating an embodiment of a system for selecting and ranking video streams that includes a site control system.

FIG. 3 is a block diagram illustrating one embodiment of a system 300 for selecting and ranking video streams. As the embodiment illustrated in FIG. 1, the embodiment shown in FIG. 3 includes a client node 302 and a receiving node 304 in electronic communication with each other via a network 306. Once again the receiving node 304 is in electronic communication with video cameras 308 and/or image sensors 310. The receiving node 304 includes a set of display criteria 320 and an analysis component 322, which may include a ranking component, a selection component, or both 124, 126 (shown in FIG. 1). Each of these components function in a manner similar to analogous components described in connection with FIG. 1.

FIG. 3, however, includes a site control system 325 that transmits control system data 328 to the receiving node 304. The site control system 325 includes one or more subsystems, such as a lighting system, doorbell/intercom system, or an audio/video system, for control of one or more sites. The control system data 328 thus indicates when subsystems within the site control system 325 have been activated, deactivated, or otherwise altered.

The analysis component 322 in the embodiment disclosed in FIG. 3 may thus utilize control system data 328 based on the set of display criteria 320 to select and rank video streams transmitted to the client node 302. Utilizing control system data 328 in connection with the set of display criteria 320 opens up a wide range of possibilities. For example, the set of display criteria 320 may specify overriding the currently displayed video stream with a video stream displaying the doorstep of a home whenever the doorbell is activated. Alternatively, the video feed of the doorstep may be saved to a buffer or other storage device for subsequent access by users whenever the doorbell is activated. As another example, whenever lights are turned on in a room with restricted access, the video stream of the room may be assigned a higher priority.

Figure 4:
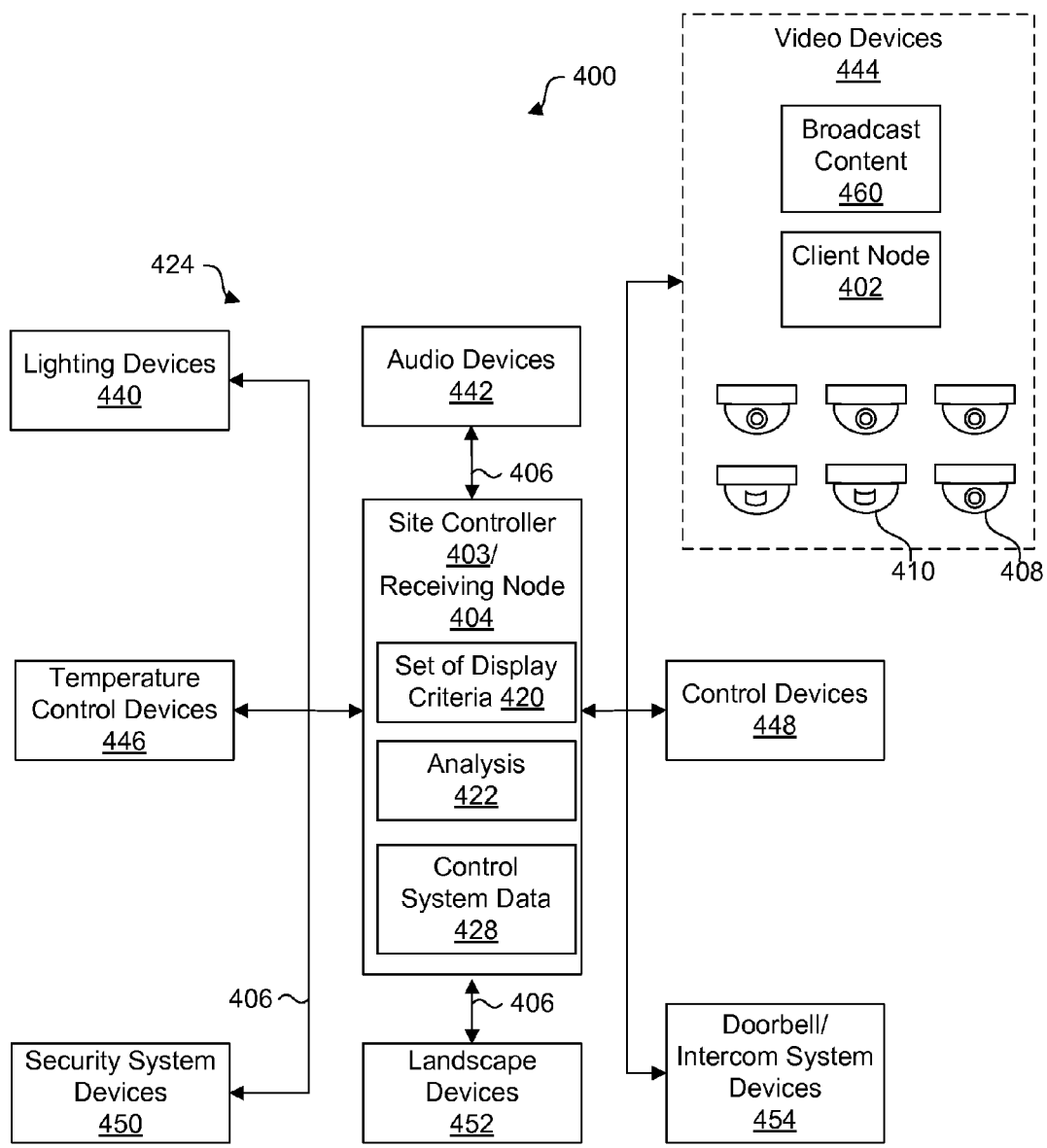
FIG. 4 is a block diagram of an embodiment of a system for selecting and ranking video streams integrated with a site control system.

A site control system 325 is illustrated with additional detail in FIG. 4. Accordingly, additional examples of sets of display criteria 320 that use control system data 328 will be discussed in connection with FIG. 4.

As explained in connection with FIG. 1, the embodiment shown in FIG. 3 may be varied in a number of ways within the scope of the disclosed systems and methods. For example, the set of display criteria 320 may rely on data outside of the site control system 325 and further outside of the video streams themselves, such as RFID sensor data. Further, by way of example only, the video cameras 308 and image sensors 310 may be indirectly coupled to the receiving node 304 via, for example, the network 306, rather than being directly coupled to the receiving node 304, as illustrated in FIG. 3.

FIG. 4 is a block diagram illustrating one embodiment of a system 400 for ranking and selecting video streams. The system 400 depicted in FIG. 4 is similar to the system 300 depicted in FIG. 3. In the embodiment shown in FIG. 4, however, the receiving node 404 and a site controller 403 (for controlling and managing a site control system 424) are integrated. While the receiving node 404 and site controller 403 are integrated, these components may, in certain embodiments, utilize distinct software and/or hardware systems for performing the site control and video stream selection and ranking functions.

The site controller 403/receiving node 404 is in electronic communication with the client node 402 and various video cameras 408 and/or image sensors 410, using a network 406. The site controller 403/receiving node 404 includes a set of display criteria 420, an analysis component 422, and control system data 428.

As with the embodiments disclosed in connection with FIGS. 1 and 2, the analysis component 422 utilizes the set of display criteria 420 and control system data 428 to determine which video streams will be selected and transmitted to the client node 402. The analysis component 422 may further use the set of display criteria 420 to rank the video streams. The analysis component 422 may include a selection and/or ranking component, which are shown in FIG. 1.

The disclosed site control system 424 includes a number of subsystems. By way of example only, these subsystems could include lighting devices 440, audio devices 442, video devices 444, temperature control devices 446, control devices 448, security system devices 450, landscape devices 452, and doorbell/intercom system devices 454.

Lighting devices 440 may include light switches, dimmers, window blinds, fireplaces, window blinds, etc. Audio devices 442 may comprise AM/FM radio receivers, satellite radio receivers, CD players, MP3 players, cassette tape players, amplifiers, tuners, speakers, speaker points for distributing audio to other points/speakers, and other site devices capable of producing an audio signal. The video devices 444 could include devices for receiving broadcast content 460, DVD players, digital video recorders, satellite boxes, cable boxes, video game systems, televisions, a client node 402 for displaying video streams, and one or more video cameras 408, image sensors 410, or other types of sensors. The client node 402 may include televisions, monitors, projectors, a personal computer with a monitor, a digital video recorder and a television set, and other site devices capable of displaying video streams. A temperature control device 446 may be a thermostat, fan, fireplace, furnace, in-floor heating, and the like. The control devices 448 may include touch screens, mini touch screens, keypads, site remote controls, LCD keypads, or other devices capable of controlling a site controller 403/receiving node 404. Security system devices 450 may include motion detectors, door sensors, window sensors, gate sensors, or other security devices. Landscape devices 452 may include sprinkler system devices, drip system devices, automated fertilizer dispensing systems that dispense fertilizer through the sprinkler systems, and other landscape related devices. Doorbell/intercom system devices 454 may be embodied as intercom microphones and speakers, intercom related video devices, and other devices typically associated with a doorbell or intercom system.

Use of control system data 428 in connection with the set of display criteria 420, as stated above, enables a wide range of useful possibilities. The set of display criteria 420 could specify, for example, that when any lighting device 440 is activated after midnight, the video stream for the pertinent area is assigned a higher priority. A set of display criteria 420 could also specify that whenever control devices throughout the entire site control system 424 are activated, the video stream(s) associated with the pertinent area are assigned a higher priority. A higher priority could also be assigned to video streams showing areas where security features/alarms have been activated. For example, where a window alarm is triggered, the video camera monitoring that area may be assigned a higher priority.

As another example, a set of display criteria 420 could specify that if motion or heat above a certain threshold is detected in a user's yard between midnight and 5 a.m., the video stream for the area in which motion is detected is given a higher priority. A user could then be prompted (by pressing the "OK" button on a remote control) to activate the sprinkler system (one of the landscape devices 452) for the area of interest, discouraging animals and other trespassers from remaining on the property. Alternatively, the sprinkler system could be automatically activated and a video stream could be given a high priority such that the user may view the pertinent video the following morning.

In one embodiment, the site controller 403/receiving node 404 could transmit a message (such as to a user's work e-mail address) notifying a user that a high priority video is available for viewing. The message could include the video clip or a link to access the video from the site controller 403/receiving node 404. The message could be embodied in a number of different ways, such as an e-mail message or in instant message.

The systems 400 disclosed in FIG. 4 may be embodied in various ways. For example, the site controller 403/receiving node 404 and client node 402 may comprise an integrated device. Alternatively, the site controller 403 could be a separate device while the receiving and client nodes could be integrated devices.

Figure 5:
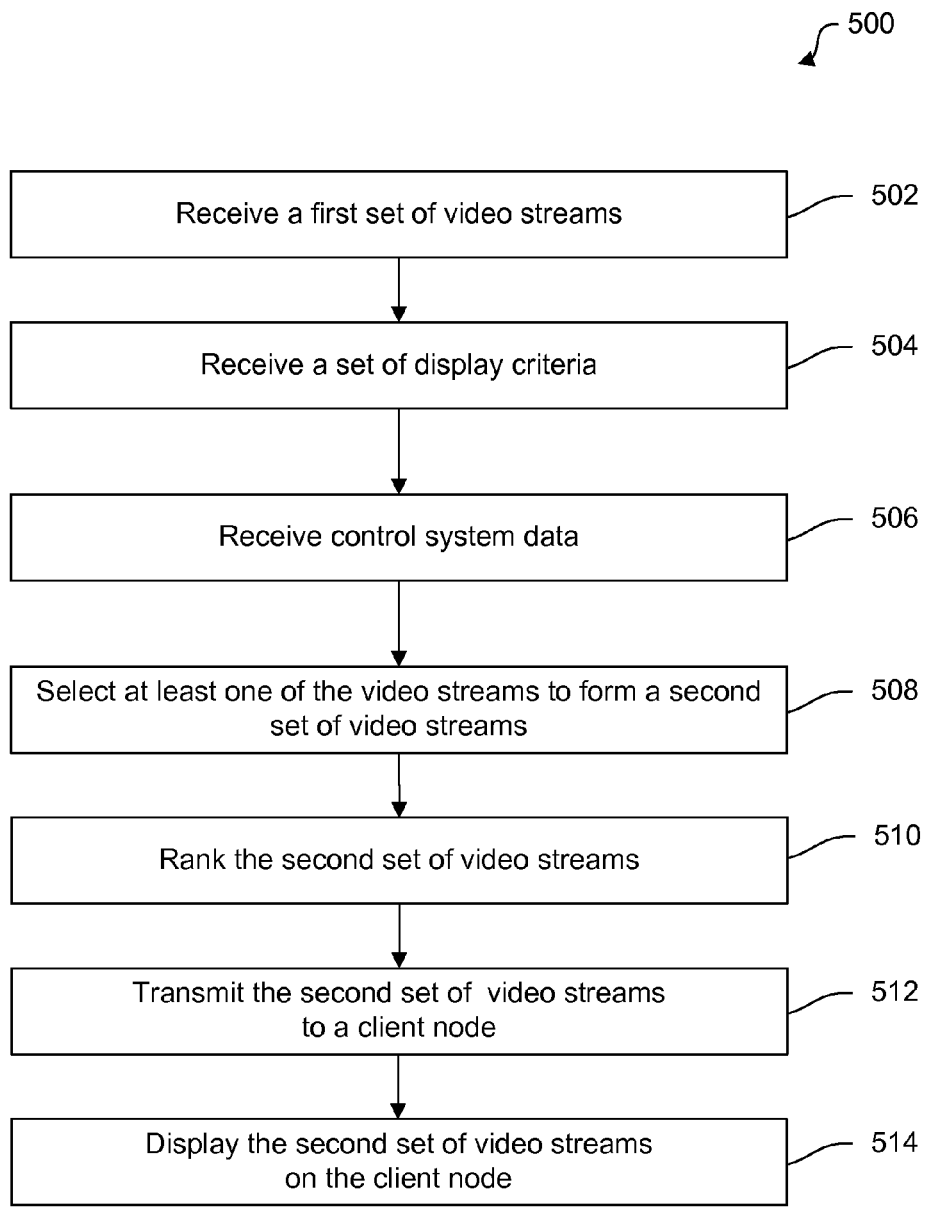
FIG. 5 is a flow diagram illustrating one embodiment of a method for selecting and ranking video streams.

FIG. 5 is a flow diagram 500 illustrating one method of selecting and ranking video streams. A first set of video streams are received 502 at a receiving node 404, which may be integrated with a site controller 403. The first set of video streams may comprise, for example, broadcast content 460 or video from surveillance or local video cameras. The first set of video streams may comprise a single or multiple video streams.

The receiving node 404 also receives 504 a set of display criteria 420. As indicated above, the set of display criteria 420 specifies one or more criteria which the analysis component 422 uses to determine which video streams are selected and transmitted to a client node 402. The set of display criteria 420 may also, in one embodiment, identify one or more criteria upon which the video streams may be ranked and when the video streams are transmitted to the client node 402.

In one embodiment, control system data 428 is received 506 from a control system that may include a site controller 403. The control system data 428 could, for example, indicate when lights are turned on at a specific area monitored by a video camera 408 or when a doorbell has been activated.

At least one of the video streams is then selected 508 using a set of display criteria 420 to form a second set of video streams. In one embodiment, the second set of video streams are also ranked 510. The selecting and ranking processes may be performed by an analysis component 422, which is shown, for example, in FIG. 4. As explained above, the selecting and ranking steps may be intertwined or may be completely independent.

The second set of video streams are then transmitted 512 to a client node 402 for display in accordance with the set of display criteria 420. The second set of video streams may be transmitted 512 in a ranked format 130, such as in a single video stream displaying the ranked video streams in a matrix, which may include a single column or row of video streams. Alternatively, ranking data 129 is transmitted to the client node 402 and the client node 402 performs a process of formatting the second set of video streams. The second set of video streams could comprise all or less than all of the video streams in the first set of video streams.

The set of display criteria 420 may control when and the conditions upon which the second set of video streams are transmitted 512 to the client node 402. As explained above, one or more of the video streams from the second set of video streams may override a video stream currently displayed on the client node 402 as dictated by the set of display criteria 420.

Thereafter, the second set of video streams received at the client node is displayed 514. Again, the displaying 514 may take on a number of different forms depending on the set of display criteria and the capabilities of the client node 402. In one embodiment, displaying 514 comprises overriding a currently displayed stream with one or more of the second set of video streams, which may include concurrent display of one or more of the video streams from the second set of video streams together with the content that was, before the interruption, displayed on the client node 402. Of course, video streams could be displayed in a matrix, which could include a single row or column of video streams. Also, the client node 402 may include a DVR (or a personal computer with DVR capabilities) that allows for subsequent viewing of the ranked/selected video streams at a time that is convenient to the user.

The methods 500 disclosed in FIG. 5 may be embodied in various ways. As such, the method 500 may be implemented using ranking 510 of the first set of video streams without selecting 508 or limiting the second set of video streams transmitted to the client node 402. Alternatively, the disclosed method 500 could be implemented by selecting 508 certain video streams to form the second set of video streams and transmitting 512 the second set of video streams in an unranked manner to the client node 402.

Further, the site controller 403 disclosed in FIG. 4 may be utilized in connection with systems and methods for selecting and ranking video streams. As indicated above, site controllers 403 may be integrated with a receiving node or be separate from the receiving node and transmit control system data 428 to a receiving node.

Figure 6:
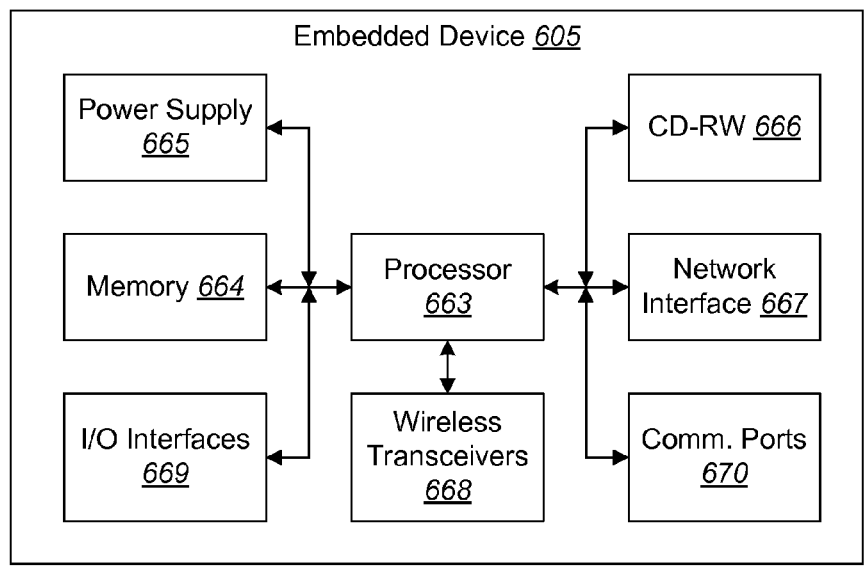
FIG. 6 is a block diagram illustrating various hardware components that may be used in an embodiment of an embedded device that may be used in connection with the disclosed systems and methods.

FIG. 6 is a block diagram illustrating various hardware components that may be used in an embodiment of an embedded device 605. The site controller 403, receiving node 404, client node 402, devices controlled by the site controller 403, and other devices within the disclosed systems and methods may be embedded devices 605.

The embedded device 605 may include a processor 663 that is in electronic communication with memory 664. The memory 664 may include volatile and/or non-volatile memory. The embedded device 605 may include a power supply 665. The embedded device 605 may include a CD-RW, CD-ROM drive, DVD-RW, DVD-ROM drive, Blu-ray disk, HD DVD drive, or other storage devices. The embedded device 605 may be capable of using the CD-RW drive 666 to rip audio or video data from CDs and DVDs.

The embedded device 605 may include a network interface 667 that allows the embedded device 605 to connect using wired connections, such as Ethernet connections. The network interface 667 may use various protocols to enable the embedded device 605 to interface with any wired network. The embedded device 605 may include any type of wireless transceivers 668. For example, the wireless transceiver 668 may allow the embedded device 605 to transmit and receive data using any wireless protocol, such as WiFi, ZigBee, Bluetooth, Ultra Wideband, Wimax, and/or cellular protocols, such as GSM or EVDO.

The embedded device 605 may include I/O interfaces 669. For example, the I/O interfaces 669 may include inputs and/or outputs such as buttons, selection dials, serial ports, contact ports, relay ports, IR windows, IR ports, video sense loop ports, audio ports, and video ports. The embedded device 605 may include communication ports 670. The communication ports 670 may include USB ports, firewire ports, or other ports for communicating with other devices.

Some site controllers 403 and devices may not include all of the illustrated components. Other site controllers 403 and devices may include additional components. For example, many devices may not include a CD-RW drive 666.

Figure 7:
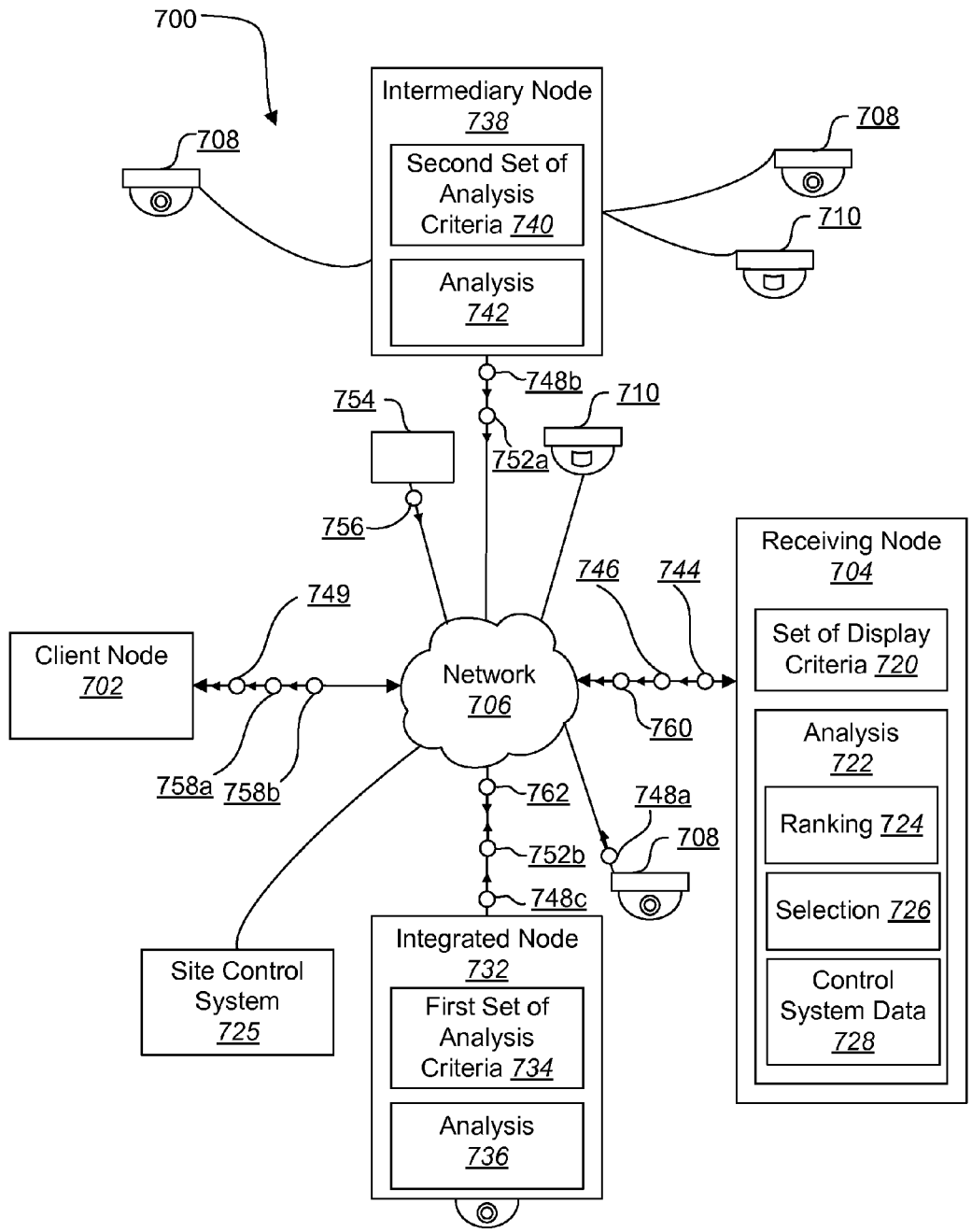
FIG. 7 is a block diagram illustrating one embodiment of a system for selecting and ranking video streams utilizing video stream values.

FIG. 7 illustrates one embodiment of a system 700 for selecting video streams using distributed processing of the streams. The illustrated system utilizes a client node 702, an intermediary node 738, an integrated node 732, and a receiving node 704 in communication via a network 706. The system may also include video cameras 708 and image sensors 710 (e.g., laser image sensors, passive infrared image sensors, ultrasonic image sensors, microwave image sensors, or sensors that use a combination of these technologies). The system may also include other types of sensors, such as smoke detectors and weight detectors, that generate sensed data. A site control system 725 is also utilized in the disclosed embodiment.

As with previously discussed embodiments, the embodiment shown in FIG. 7 includes a receiving node 704. The receiving node 704 includes a set of display criteria 720 and an analysis component 722. The analysis component 722 includes a ranking component 724, a selection component 726, and control system data 728. The analysis component 722, utilizing the ranking component 724, may rank video streams 748 based on the set of display criteria 720. The selection component 726 may select which video streams 748 will be transmitted to a client node 702 or will otherwise be displayed. The analysis component 722 may also utilize a control system data 728 from the site control system 725 to rank and/or select video streams 748 based on the set of display criteria 720. Not all embodiments of the disclosed systems utilize both ranking 724 and selection 726. For example, one embodiment may select but not rank video streams 748.

The receiving node 704 of the disclosed embodiment, however, includes capabilities beyond those in previously discussed embodiments. Rather than receiving all of the video streams 748 themselves, the receiving node 704 may receive a set of video stream values 752.

A video stream value 752 may be much smaller in size than the video streams 748 themselves and thus may require much less network bandwidth to transmit these values via the network 706. A video stream value 752 could be an indicator of the importance of the video stream 748 using the set of analysis criteria 722, which is related to the set of display criteria 720 and will be discussed below. For example, the video stream value 752 could be a number from 0 to 10 with 10 indicating that the video stream 748 has a high priority value and is significant in view of the set of analysis criteria 722. It could also be either a 0 or 1 indicating that the analyzed video stream 748 is not important in view of the set of analysis criteria 722. A video stream value 752 could also be a segment of a video stream 748 or a vector of values.

In addition, each video stream value 752 may comprise a set of values corresponding to different characteristics of single video stream 748. For example, one value in a set may relate to the level of motion in a video stream 748, another value may relate to identification of a particular shape, color or other feature within the video stream 748, and another value may relate to data received from other sensors, such as in RFID sensor. As shown above, a video stream value 752 may be embodied in various ways within the scope of the disclosed systems and methods.

Analysis of a video stream 748 to generate a video stream value 752 may be performed in a distributed fashion, such as at an intermediary node 738, at an integrated node 732, or even at a client node 702. Thus, there are at least two advantages of using video stream values 752. First, much less network bandwidth is required to transmit a video stream value 752 rather than the video stream 748 itself. Second, the processing and analysis of the video streams 748 is distributed over various nodes, decreasing the processing power and burden on the receiving node 704.

These advantages can be particularly important when hundreds or thousands of video streams 748 and various data types generated by the sensors are being analyzed. For example, a receiving node 704 may only be able to analyze 20 video streams 748 simultaneously based on the set of display criteria 720. Furthermore, network bandwidth may limit how many video streams 748 may be simultaneously transmitted to the receiving node 704. However, using distributed processing of the video streams 748, even systems of average processing power could analyze hundreds or even thousands of video streams 748 using intermediary nodes 738, integrated nodes 732, or other types of distributed nodes.

Of course, a single receiving node 704 could process both video streams 748 and video stream values 752, or alternatively could process exclusively one of these two types of data.

Thus, in the disclosed embodiment, the analysis component may rank and/or select a set of video streams 748 based on an analysis of the video streams 748 themselves and/or based on video stream values 752. As indicated above, control system data 728 or other types of sensed data may also be utilized in this analysis.

A transmission message 744 may be sent, for example, to an intermediary node 738, an integrated node 732, or video camera 708 to cause video streams 748 from the selected set of video streams 748 to be transmitted directly to a client node 702. Alternatively, the transmission message 744 may cause the selected set of video streams 748 to be sent to the receiving node 704, after which the set of video streams 748 will be forwarded to a client node 702. The set of video streams 748 may be transmitted to the client node 702 in a ranked format 758a or unranked format 758b. Also, data 749 may be sent to the client node 702 such that the client node 702 can arrange the set of video streams 748 in a ranked format 758a.

Also, in lieu of transmitting the video streams 748, a request message 746 may be sent to one of the nodes (such as the client node 702) indicating, for example, that there is a high degree of activity or something of interest is perhaps occurring in the scene(s) being captured. The user could then be asked (via, for example, a display prompt or audible question using text-to-speech technology) if they would like to view the video stream(s) 748 of interest.

The disclosed system may include one or more integrated nodes 732. The integrated node 732 is a node that includes at least one sensing device 754, such as a video camera 708, as illustrated in FIG. 7, and processing capabilities. The processing capabilities enable analysis of gathered data 756 at the node. The integrated node 732 shown in FIG. 7 includes a first set of analysis criteria 734 and an analysis component 736. The analysis component 736 may analyze the gathered video stream 748c based on the first set of analysis criteria 734 to generate a video stream value 752b.

The first set of analysis criteria 734 may be the same as the set of display criteria 720 or it may comprise a subset of the set of display criteria 720 that pertains only to a specific node. In either case, the first set of analysis criteria 734 must include sufficient data through which the analysis component 736 may generate a video stream value 752b based on an analysis of the gathered video stream 748c. The integrated node 732, as indicated above, may be integrated with, for example, other sensing devices 754 and/or the site control system 725. Data received from these other sensing devices 754 and/or the site control system 725 may likewise be processed by the analysis component 736 to generate a video stream value 752b or to determine whether a video stream 748c should be transmitted.

As noted above, the system may also include one or more intermediary nodes 738. An intermediary node 738 is a node in communication with one or more sensing devices 754 and the receiving node 704. The intermediary node 738 may act as a hub for gathered video or sensed data from sensing devices 754. As illustrated in FIG. 7, two video cameras 708 and an image sensor 710 are connected to the intermediary node 738. Connections between the sensing devices 754 and the intermediary node 738 may be direct connections or connections via a network 706. The intermediary node 738 could be coupled to any number of sensing devices 754 in a wide variety of configurations.

The intermediary node 738 may include a second set of analysis criteria 740 and an analysis component 742. As before, the gathered data 756 is analyzed based on the second set of analysis criteria 740 to generate a video stream value 752a for one or more video streams 748b or to determine which video streams 748b will be transmitted. The results of the analysis may be transmitted to the receiving node 704 for further processing, as explained above.

The second set of analysis criteria 740 may be embodied in various ways. The second set of analysis criteria 740 may be the same as a set of display criteria 720 or the first set of analysis criteria 734. Alternatively, the second set of analysis criteria 740 may be unique to the intermediary node 738 based, for example, on the sensing devices 754 in communication with the intermediary node 738.

Also, in one embodiment, if none of the video streams 748 satisfy the set of display criteria 720, a notification message 760 may be sent to the user to indicate the same. The notification message 760 may be, for example, an audio or a visual message. The notification message 760 may be sent at specific intervals of time, at a single specified time, or within a specified time period, if the set of display criteria 720 has not been satisfied at the applicable time(s).

It should be noted that any portion of the analysis component 722 (e.g., ranking component 724, selection component 726, control system data 728) or the set of display criteria 720, could be stored or implemented on a number of different nodes. For example, these components and data 720, 722, 724, 726, 728 could be stored or implemented on an intermediary node 738, an integrated node 732, a client node 702, a video camera 708, an image sensor 710, or any type of sensing device 754. When the ranking or selection component 724, 726 is implemented in a camera 708 or other sensor 710, 754, the camera 708 or other sensor 710, 754 may generate two data streams, a stream for the video streams 748 and a stream for the video stream values 752. Alternatively, the ranking or selection components 724, 726 may control which video streams 748 are transmitted or broadcast by the camera 708 or other sensor 710, 754, such that no video stream values 752 are transmitted or broadcast by the camera 708 or other sensor 710, 754. Sensors 754 that do not gather image data may also generate data that aids in determining video stream values 752 or may actually generate video stream values 752. As an example, smoke detector data from a specific room could control and determine whether to emphasize or select for transmission video streams 748 from all cameras 708 directed to that room. The analysis component 722 could utilize this and other data to determine how to rank and select video streams 748.

In one embodiment, instructions 762 are received by the receiving node 704, integrated node 732, intermediary node 738, camera 708, or other sensor 710, 754 to transmit or stop transmitting video streams 748. The instructions 762 may be transmitted by various sources, such as the client node 702.

The embodiment shown in FIG. 7 is merely illustrative. Many aspects of the embodiment shown in FIG. 7 may be varied within the scope of the disclosed system. For example, the disclosed system could include many integrated and intermediary nodes 732, 738, and many video cameras 708 or other types of sensing devices 754, beyond those illustrated in FIG. 7. Also, the analysis component 736, 742 in an integrated or intermediary node 732, 738 may include ranking or selection components 724, 726 and may also utilize control system data 728 to generate video stream values 752. Further, the analysis component 736, 742 in the integrated node 732 and the intermediary node 738 may each include a ranking component 724 and a selection component 726, and may also utilize control system data 728. Also, in one embodiment, the receiving node 704 and client node 702 are an integrated device.

In one embodiment, the analysis component 722 may give different weights to received data. For example, a motion value may be given a certain weight and a heat value may be given a different weight to determine how to rank or select video streams 748. The set of criteria 720 may utilize many different types of data, such as motion data, lack of motion data, fire data, smoke data, infrared data, moisture data, rain data, running water data (e.g., whether and where water is running in the house, location, or structure), data related to the presence or absence of a person or animal within a scene or area, differences in scenes (comparing the history of the scene), time/schedule data, or user specified data. Also, the aggregate of many different types of data may also be of significance in relation to ranking and selection of video stream 748. As an example, an alarm could be triggered (e.g., ranking and/or selecting a set of video streams 748) by three data sources (e.g., motion data, rain data, and infrared data) with a value of "4" where the values range from "0" (not of interest) to "10" (high interest). Thus, a user may specify the criteria 720 used to determine which video streams 748 are displayed in many different ways.

There are many ways to present and emphasize or deemphasize certain video streams 748. For example, video streams 748 may be alternatively sequenced or shown with some streams 748 missing, some played longer, the order changed, or some tagged within icon or other visual indicator of significance. In other embodiments, only highly ranked video streams 748 are displayed and cycled through; highly ranked video streams 748 are shown more often and for a longer period of time than lower ranked video streams 748; highly ranked video streams 748 occupy larger sections of the display screen with lower rank video streams 748 in smaller sections; only highly ranked video streams 748 above a certain threshold are shown on a single screen; all video streams 748 may be shown with the icons or numeric values that represent ranking; or combinations of various techniques may be used to show ranking. The ranking may or may not be displayed or even known to the user. Also, highly ranked video streams 748 could be forwarded to a third party, such as a security company. The video cameras 708, other sensors 710, 754, receiving node 704, integrated node 732, and/or intermediary node 738 could push or transmit their output, or could be polled.

Figure 8:
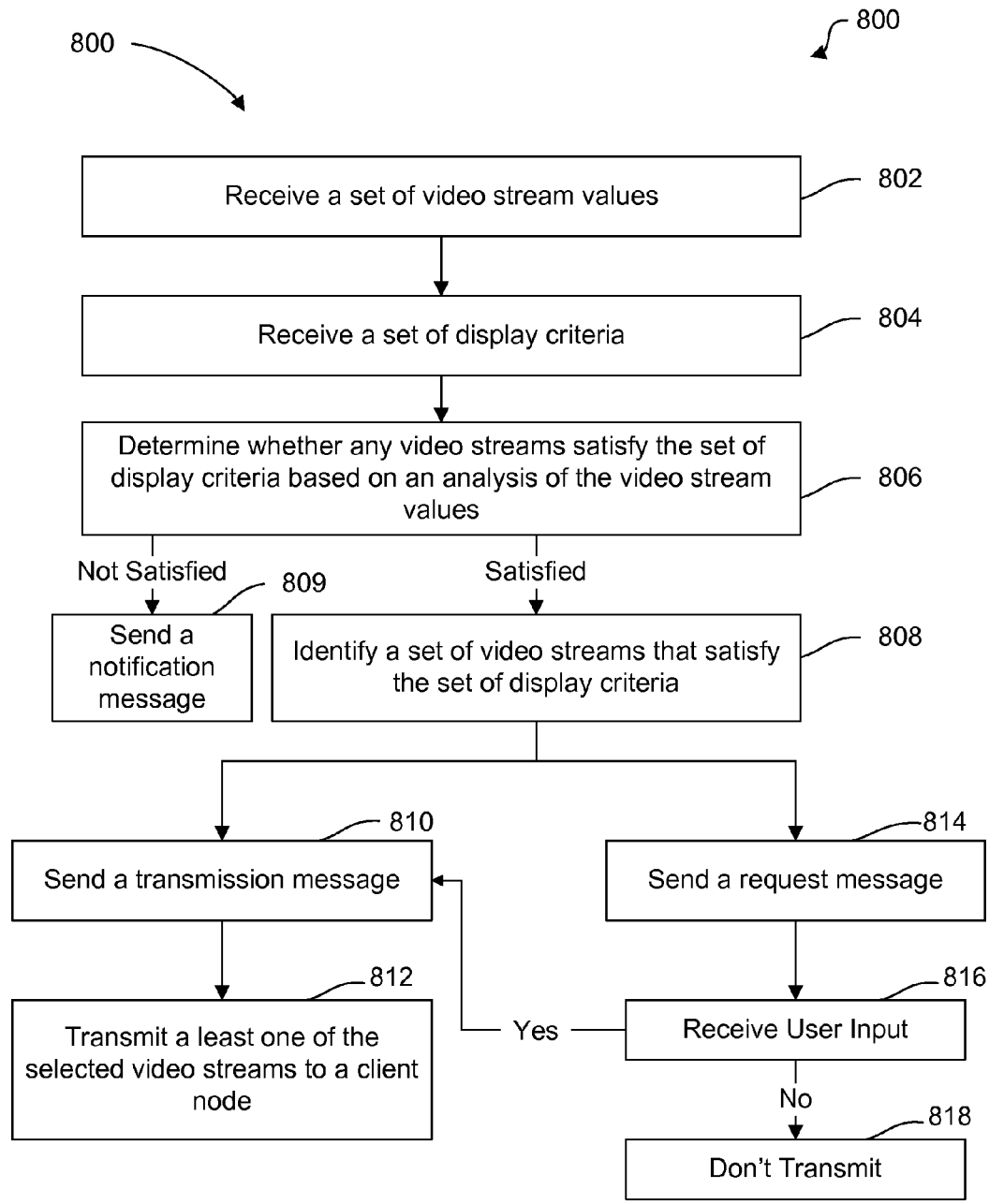
FIG. 8 is a flow diagram illustrating one embodiment of a method for selecting and ranking video streams utilizing video stream values.

FIG. 8 is a flow diagram 800 illustrating one embodiment of a method for selecting video streams 748 based on video stream values 752. A set of video stream values 752 are received 802 at a receiving node 704. As explained above, a video stream value 752 may be embodied in various ways. A value may include a single value indicating a characteristic of a video stream 748, such as whether motion is present, or the degree to which motion is present within a video stream 748. The video stream value 752 may include a number of values corresponding to a single video stream 748. The video stream value 752 takes into consideration data gathered from other sensors, such as image sensors 710 or RFID sensors. A video stream value 752 could also include ranking data where multiple video streams 748 are analyzed at a single node, such as at the intermediary node 738 illustrated in FIG. 7. Video stream values 752 may be generated by other nodes, such as an integrated node 732 which is also illustrated in FIG. 7.

A set of display criteria 720 are received 804 at the receiving node 704. The set of display criteria 720 may be received at the receiving node 704 before, during, or after the set of video stream values 752 are received at the receiving node 704. The receiving node 704 may also receive video streams 748 and analyze those streams in addition to receiving video stream values 752.

The set of display criteria 720, as explained above, may be utilized to rank and/or select video streams 748 based on the video stream values 752, the video streams 748 themselves, control system data 728, and/or data received from various sensing devices 754. The set of display criteria 720 may also control procedures for distribution of the video streams 748. The set of display criteria 720 may, for example, mandate that the set of selected video streams 748 are displayed on a client node 702. The set of display criteria 720 may promptly determine whether the set of selected video streams 748 should be displayed. To summarize, the set of display criteria 720 may control selection and/or ranking of video streams 748 and may also control the action to be taken when a video stream 748 is found to satisfy the set of display criteria 720.

It is then determined 806 whether any of the video streams 748 satisfy the set of display criteria 720 based on the video stream values 752. It should be noted that in some embodiments, at least some of the video streams 748 themselves may be received at a receiving node 704 and analyzed directly by the receiving node 704.

If any of the video streams 748 satisfy the set of display criteria 720, a set of video streams 748 are identified 808. The set of video streams 748 may include one video stream 748 or even hundreds or thousands of video streams 748. There is no limit on the number of video streams 748 that may be included in an identified set. If none of the video streams 748 satisfy the set of display criteria 720 at a specified time, at specified time intervals, or within a specified time period, a notification message 706 may be sent 809 to the user indicating the same.

In one embodiment a transmission message 744 is then sent 810 requesting that the pertinent video cameras 708 and/or nodes transmit 812 at least one of the video streams 748 to a client node 702. The set of display criteria 720 could also specify that the set of selected video streams 748 be transmitted to multiple different nodes or that some of the selected video streams 748 be transmitted to one node and some of the video streams 748 be transmitted to another node. In response to the transmission message 744, one or more video streams 748 from the selected set of video streams 748 are transmitted to one or more client nodes 702.

The selected video streams 748 may thus be transmitted directly to the client node 702 and do not need to be transmitted in all cases to the receiving node 704 for analysis. Furthermore, video streams 748 may be analyzed at distributed locations, such as at an integrated node 732 or at an intermediary node 738. The disclosed system thus minimizes the transmission of video streams 748 across the network 706, freeing network bandwidth for other tasks.

In another embodiment, a request message 746 may be sent 814 to determine whether the user wants to view one of the selected video streams 748. Thereafter, user input is received 816. If the user indicates that the user would like to view at least one of the video streams 748, the transmission message 744 may be sent 810. If a user indicates that the user does not want to view the video stream(s) 748, no video streams 748 are transmitted 818. As a result, the burden on the network 706 may be further decreased in that only those video streams 748 that satisfy the set of display criteria 720 and those that the user wants to view are transmitted across the network 706.

The method described in FIG. 8 is only illustrative and should not be construed as the only possible embodiment of the disclosed method. By way of example only, the disclosed system could utilize a null message which would indicate that none of the video streams 748 satisfy the set of display criteria 720. Also, it should be noted that the order performing the particular steps may be varied within the scope of the disclosed method.

Information may be represented using any of a variety of different technologies and techniques. For example, data, instructions, commands, information, bits, symbols, and chips that may be referenced throughout the above description may be represented by voltages, currents, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in the hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for selecting video streams to be transmitted to a client node, comprising:
   receiving a set of video stream values at a receiving node, wherein each video stream value is smaller in size than each corresponding video stream and comprises a numeric value, a segment of a video stream or a vector of values, wherein a video stream value indicates a priority of a corresponding video stream, wherein each of the video stream values indicates a degree to which motion is present in the corresponding video stream;
   receiving a set of display criteria at the receiving node, wherein the set of display criteria indicates when to transmit the video streams to the client node;
   ranking the video streams based on the set of display criteria;
   selecting a subset of highest ranked video streams based on the set of display criteria and the set of video stream values to form a subset of the highest ranked video streams, wherein the subset of the highest ranked video streams comprises less than all of the video streams; and
   transmitting, after the selecting and the ranking, only the subset of the highest ranked video streams via a network to the client node in accordance with the set of display criteria, wherein a node that is remote to the receiving node transmits the subset of the highest ranked video streams to the client node.

2. The method of claim 1, further comprising displaying one or more of the video streams from the subset of the highest ranked video streams at the client node.

3. The method of claim 2, wherein the displaying comprises overriding a currently displayed stream to display the one or more video streams from the subset of the highest ranked video streams.

4. The method of claim 1, further comprising transmitting ranking data to the client node.

5. The method of claim 1, further comprising transmitting the subset of the highest ranked video streams to the client node in a ranked format.

6. The method of claim 1, further comprising receiving control system data at the receiving node.

7. The method of claim 6, wherein the set of display criteria utilizes the control system data.

8. The method of claim 7, wherein the control system data indicates whether a light switch within a control site is on or off.

9. A node on a network that is configured to select video streams to be transmitted to a client node, the node comprising:
   a processor;
   memory in electronic communication with the processor; and
   instructions stored in the memory, the instructions being executable to:
   receive a set of video stream values at a receiving node, wherein each video stream value is smaller in size than each corresponding video stream and comprises a numeric value, a segment of a video stream or a vector of values, wherein a video stream value indicates a priority of a corresponding video stream, wherein each of the video stream values indicates a degree to which motion is present in the corresponding video stream;
   receive a set of display criteria, wherein the set of display criteria indicates when to transmit the video streams to the client node;
   rank the video streams based on the set of display criteria;
   select a subset of highest ranked video streams based on the set of display criteria and the set of video stream values to form a subset of the highest ranked video streams, wherein the subset of the highest ranked video streams comprises less than all video streams; and
   transmit, after the selecting and the ranking, only the subset of the highest ranked video streams via the network to the client node in accordance with the set of display criteria, wherein a node that is remote to the receiving node transmits the subset of the highest ranked video streams to the client node.

10. The node of claim 9, wherein the instructions are further executable to display one or more of the video streams from the subset of the highest ranked video streams at the client node.

11. The node of claim 10, wherein the displaying comprises overriding a currently displayed stream to display the one or more video streams from the subset of the highest ranked video streams.

12. The node of claim 9, wherein the instructions are further executable to receive control system data at the receiving node and the set of display criteria utilizes the control system data.

13. A non-transitory tangible computer-readable storage medium comprising executable instructions to select video streams to be transmitted to a client node, the instructions being executable to:
   receive a set of video stream values at a receiving node, wherein each video stream value is smaller in size than each corresponding video stream and comprises a numeric value, a segment of a video stream or a vector of values;
   receive a set of display criteria at the receiving node, wherein the set of display criteria indicates when to transmit the video streams to the client node;
   rank the video streams based on the set of display criteria;
   select a subset of highest ranked video streams based on the set of display criteria and the set of video stream values to form a subset of the highest ranked video streams, wherein the subset of the highest ranked video streams comprises less than all video streams, wherein a video stream value indicates a priority of a corresponding video stream, wherein each of the video stream values indicates a degree to which motion is present in the corresponding video stream; and
   transmit, after the selecting and the ranking, only the subset of the highest ranked video streams via a network to the client node in accordance with the set of display criteria, wherein a node that is remote to the receiving node transmits the subset of the highest ranked video streams to the client node.

14. The non-transitory tangible computer-readable storage medium of claim 13, wherein the instructions are further executable to display one or more of the video streams from the subset of the highest ranked video streams at the client node.

15. The non-transitory tangible computer-readable storage medium of claim 14, wherein the displaying comprises overriding a currently displayed stream to display the one or more video streams from the subset of the highest ranked video streams.

16. The non-transitory tangible computer-readable storage medium of claim 13, wherein the instructions are further executable to receive control system data at the receiving node and the set of display criteria utilizes the control system data.

17. A method for selecting video streams based on video stream values, comprising:
using a set of analysis criteria at a node that is remote to a receiving node to generate a set of one or more video stream values;
receiving, from the node that is remote to the receiving node, the set of video stream values at a receiving node via a network, each of the video stream values indicating at least one characteristic of a corresponding video stream, wherein each of the video stream values is smaller in size than each corresponding video stream and comprises a numeric value, a segment of a video stream or a vector of values, wherein a video stream value indicates a priority of a corresponding video stream, wherein each of the video stream values indicates a degree to which motion is present in the corresponding video stream;
receiving a set of display criteria at the receiving node, wherein the set of display criteria indicates when to transmit the video streams to a client node;
ranking the video streams based on the set of display criteria;
determining whether any video streams satisfy the set of display criteria based on an analysis of the set of video stream values and control system data, the control system data relating to control of features or components of an environment or structure; and
if any video stream satisfies the set of display criteria, identifying a subset of highest ranked video streams that satisfy the set of display criteria; and
transmitting only the subset of the highest ranked video streams that satisfy the set of display criteria from the node that is remote to the receiving node to the client node.

18. The method of claim 17, further comprising sending a notification message if the analysis of the set of video stream values indicates that no video streams satisfy the set of display criteria.

19. The method of claim 17, further comprising sending a transmission message requesting transmission of one of the video streams in the subset of the highest ranked video streams.

20. The method of claim 17, further comprising sending a request message to determine whether a user wants to view at least one of the video streams from the subset of the highest ranked video streams.

21. The method of claim 17, wherein the each video stream value comprises a set of values corresponding to different characteristics of a single video stream.

22. The method of claim 17, wherein at least one video stream value comprises a numeric value.

23. The method of claim 17, wherein one of the set of video stream values comprises a segment of the corresponding video stream.

24. The method of claim 17, further comprising receiving instructions at the receiving node to transmit or stop transmitting at least one video stream of the set of video streams.

25. The method of claim 17, wherein the node that is remote to the receiving node comprises an integrated node that includes at least one sensing device.

26. The method of claim 17, wherein the node that is remote to the receiving node comprises an intermediary node.

27. A node on a network that is configured to select video streams based on video stream values, the node comprising:
a processor;
memory in electronic communication with the processor; and
instructions stored in the memory, the instructions being executable to:
receive, from a node that is remote to the node, a set of video stream values via the network, each of the video stream values indicating at least one characteristic of a corresponding video stream, wherein each of the video stream values is smaller in size than each corresponding video stream and comprises a numeric value, a segment of a video stream or a vector of values, wherein a video stream value indicates a priority of the corresponding video stream, wherein the set of video stream values were generated by the node that is remote to the node, wherein each of the video stream values indicates a degree to which motion is present in the corresponding video stream;
receive a set of display criteria, wherein the set of display criteria indicates when to transmit the video streams to a client node;
rank the video streams based on the set of display criteria;
determine whether any video streams satisfy the set of display criteria based on an analysis of the set of video stream values and control system data, the control system data relating to control of features or components of an environment or structure;
if any video stream satisfies the set of display criteria, identify a subset of highest ranked video streams that satisfy the set of display criteria; and
send a transmission message requesting that only the subset of the highest ranked video streams be transmitted to the client node.

28. The node of claim 27, wherein the each video stream value comprises a set of values corresponding to different characteristics of a single video stream.

29. A non-transitory tangible computer-readable storage medium comprising executable instructions to select video streams based on video stream values, the instructions being executable to:
receive, from a node that is remote to a receiving node, a set of video stream values at the receiving node via a network, each of the video stream values indicating a characteristic of a corresponding video stream, wherein each of the video stream values is smaller in size than each corresponding video stream and comprises a numeric value, a segment of a video stream or a vector of values, wherein a video stream value indicates a priority of a corresponding video stream, wherein the set of video stream values were generated by the node that is remote to the receiving node, wherein each of the video stream values indicates a degree to which motion is present in the corresponding video stream;

receive a set of display criteria at the receiving node, wherein the set of display criteria indicates when to transmit the video streams to a client node;

rank the video streams based on the set of display criteria;

determine whether any video streams satisfy the set of display criteria based on an analysis of the set of video stream values and control system data, the control system data relating to control of features or components of an environment or structure;

if any video stream satisfies the set of display criteria, identify a subset of highest ranked video streams that satisfy the set of display criteria; and send a transmission message requesting that only the subset of the highest ranked video streams be transmitted to the client node.

30. The non-transitory tangible computer-readable storage medium of claim 29, wherein the each video stream value comprises a set of values corresponding to different characteristics of a single video stream.

* * * * *